Figure 3:
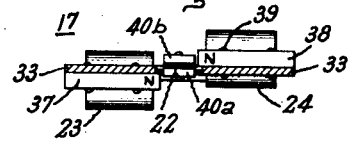

Dec. 2, 1952  P. H. ESTES  2,620,469

TEMPERATURE RESPONSIVE VARIABLE REACTANCE

Filed Oct. 29, 1949

Inventor:
Phillip H. Estes,
by William G. Edwards, Jr.
His Attorney.

Patented Dec. 2, 1952

2,620,469

UNITED STATES PATENT OFFICE 2,620,469

TEMPERATURE RESPONSIVE VARIABLE REACTANCE

Phillip H. Estes, Schenectady, N. Y., assignor to General Electric Company, a corporation of New York Application October 29, 1949, Serial No. 124,446

6 Claims. (Cl. 336—30)

This invention relates to temperature responsive controls for house heating systems and the like and particularly to thermostats for facilitating the modulated control of the temperature of a room or other enclosure.

One difficulty encountered in the thermostatic control of house heating systems is the overshooting of room temperatures and a resulting hunting action of the thermostat. In order to overcome this difficulty, various types of so-called modulating controls have been devised. Modulating controls are intended to provide continuous adjustment of the temperature changing device, a gas-fired furnace, for example, so that the amount of heat delivered is sufficient to maintain the required temperature without sudden adjustments which tend to produce overshooting. These controls have resulted in varying degrees of success; however, many of the more satisfactory modulating controls are complicated and expensive. Accordingly, it is an object of the present invention to provide an improved temperature responsive modulating control which shall be of simple construction and reliable in operation.

It is another object of this invention to provide a modulating thermostat having an improved arrangement for producing an electrical output varying in accordance with ambient temperature and which may readily be amplified and employed for effecting continuous control of a heating system or the like.

Further objects and advantages of this invention will become apparent as the following description proceeds, and the features of novelty which characterize the invention will be pointed out with particularity in the claims annexed to and forming a part of this specification.

In carrying out the objects of this invention a thermostatic element is arranged to vary the reluctance of a magnetic circuit, and electric windings are associated with the magnetic circuit in a manner such that their reactances are varied in accordance with temperature changes. More specifically, the magnetic circuit comprises magnets spaced apart with their poles in opposition and also spaced laterally so that the magnets lie in spaced planes. A magnetic armature carried by a temperature responsive motor element is arranged in the air gap so that it may move from one position substantially bridging the pair of poles of one magnet to a second position substantially bridging the poles of the other magnet. The reactances of the windings are thus varied oppositely in accordance with temperature changes. The variation in reactance may be employed to actuate any suitable amplifier which, in turn, operates the heating device or other controlled apparatus.

Figure 2:
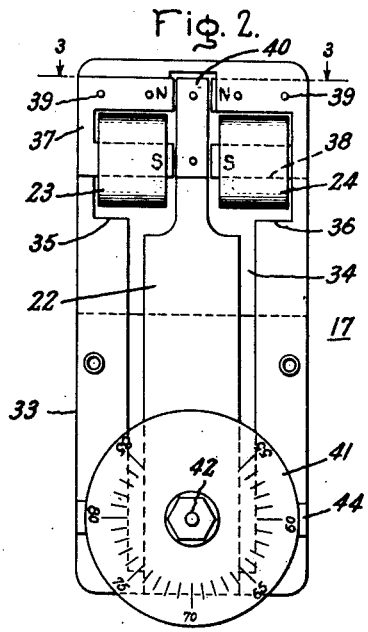
Figure 4:
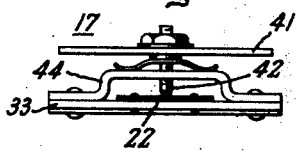
Figure 1:
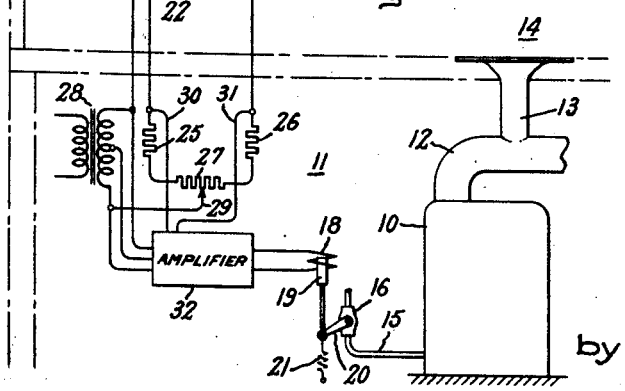

For a better understanding of this invention reference may be had to the accompanying drawing, in which Fig. 1 illustrates diagrammatically a gas-fired house heating system provided with a thermostatic control embodying this invention; Fig. 2 is an elevation view of the thermostat employed in the system of Fig. 1; Fig. 3 is a sectional view on the line 3—3 of Fig. 1; and Fig. 4 is a bottom plan view of the thermostat of Fig. 1.

Referring now to the drawing, the heating system shown in Fig. 1 comprises a gas-fired furnace 10 arranged within a basement or other machinery area 11 and provided with a main hot air discharge duct 12 having a plurality of branches for supplying heated air to the rooms of the building. One of these branches is indicated at 13, for supplying heated air to a room 14. Gas for the burners of the furnace 10 is supplied through a conduit 15 under control of a valve 16, and the products of combustion are removed through a suitable stack (not shown) connected to a chimney in the usual manner.

The heat supplied by the furnace 10 is controlled automatically by a thermostat 17 arranged to actuate the valve 16 by variably energizing a coil 18 in accordance with the demand for heat as determined by the thermostat. The coil 18 operates the valve 16 by attracting an armature 19 connected to actuate the valve through an arm 20, a balancing spring 21 being provided to oppose the force on the armature. The operation of the thermostat 17 is such that the coil 18 is energized in varying degrees corresponding to variations in the ambient temperature. The spring 21 is designed with respect to the coil 18 so that it provides a balancing action and the armature 19 then takes a predetermined position corresponding to the current in the coil. The valve 16 is thus actuated to adjust the supply of heat continuously in accordance with variations in the demand for heat as determined by changes in temperature in the ambient air surrounding the thermostat. This is a modulating action of the control and prevents sudden changes in the temperature of the air supplied to the room and thus minimizes pumping or overshooting of the control.

The thermostat 17 comprises a bimetallic strip 22 and a pair of electric windings or coils 23 and 24 and is arranged so that changes in temperature cause movement of the strip 22 and effect corresponding changes in the reactances of the coils 23 and 24. The coils 23 and 24 are connected in a bridge circuit including resistances 25 and 26 and an adjusting resistance 27. Alternating current is supplied to the bridge from the secondary winding of a transformer 28 connected to the adjacent ends of the coils 23 and 24 and to an adjustable tap 29 on the resistance 27, and output leads 30 and 31 of the bridge are connected to an amplifier 32. Power for the amplifier is supplied from the secondary of the transformer 28, and the coil 18 is connected in the output of the amplifier. The output of the amplifier 32 varies directly with the degree of unbalance of the reactances 23 and 24, which in turn varies directly with the position of the strip 22 within its normal range of movement. The output is thus directly proportional to the ambient temperature. The amplifier may be of any suitable type; for example, it may be an electronic amplifier or a magnetic amplifier such as that disclosed in United States Letters Patent No. 2,414,936 to Martin A. Edwards and Hugh M. Ogle, granted on January 28, 1947.

The construction and arrangement of the thermostat 17 are clearly shown in Figs. 2, 3 and 4. Referring now to Fig. 2, the thermostat 17 is provided with a base plate or supporting member 33. The support 33 is a flat plate of suitable nonmagnetic material, such as brass, and is formed with an opening 34 extending longitudinally over substantially the entire length of the plate and provided with enlargements 35 and 36 near the upper portion of the plate for accommodating the windings 23 and 24 respectively. The windings are mounted within the openings on the lower arms of two C-shaped magnets 37 and 38, the upper arms of the magnets being attached to the upper end of the plate 33 in any suitable manner, such as by rivets 39. The magnets 37 and 38 are disposed with their pairs of poles facing each other across an air gap centrally of the opening 34. The poles of the magnets are arranged to buck each other, like poles being opposed, and a magnetic armature 40 is carried by the upper end of the bimetallic strip 22 so that it may move in the air gap between the pairs of poles. In the construction illustrated the armature 40 comprises two parts 40a and 40b on opposite faces of the strip 22, as clearly shown in Fig. 3. It is also clearly shown in Fig. 3 that the magnets 37 and 38 are arranged on opposite sides or faces of the plate 33. Thus when the armature 40 moves with the bimetallic strip transversely of the plane of the plate 33, it moves from a position substantially shunting the poles of one of the magnets to a position substantially shunting the poles of the other magnet. Thus the reactances of the windings 23 and 24 are varied oppositely in accordance with movement of the armature 40, and the balance of the electrical bridge shown in Fig. 1 is varied accordingly in response to the changes in ambient temperature which have caused movement of the bimetallic strip 22.

The range of movement of the strip 22 may be adjusted by turning a dial 41 mounted on a threaded shaft 42 in a bracket 44 which is attached to the plate 33. The shaft 42 engages the bimetal strip 22 and the position of the shaft determines the location of the armature 40 within the air gap. Thus for a given range of temperatures the armature may be made to move within a selected range of movement between the poles of the magnets 37 and 38. By adjusting the dial 41 the temperature to be maintained by the thermostat is determined, it being understood that by the operation of the heating system as illustrated in Fig. 1 heat will be supplied under control of the valve 16 at a rate determined by the position of the thermostat.

When the heating system and control are installed the plate 33 is mounted by any suitable supporting elements (not shown) in a position such that the bimetallic strip 22 is sensitive to room temperature. Preferably the plate is mounted vertically, as shown, so that any heat produced by energization of the windings 23 and 24 will cause an upwardly moving current of air tending to draw ambient air over the strip 22 and minimizing any heating of the strip which might otherwise be caused by the heating of the coils.

The arrangement of the magnetic coils on opposite sides of the nonmagnetic mounting plate 33 provides a simple and effective arrangement for securing displacement of the magnets in planes substantially parallel to the plane of the mounting plate and so that the bimetallic strip 22 may easily be mounted for movement between the pairs of poles of the magnets and transversely of the planes of the magnets. Since the bimetallic strip moves the armature 40 transversely of the planes of the magnets 37 and 38, there is negligible magnetic force tending to displace the armature during its movement. This will be apparent when it is considered that the magnetic force on the armature 40 is mainly perpendicular to the direction of motion of the strip 22, and such components of force as may be present due to the fringing flux at the edges of the armature are opposed in the air gaps on either side of the armature and tend to cancel out.

During the operation of a heating system provided with a thermostatic control embodying this invention it has been found that satisfactory modulation of the heat supplied by a gas-fired furnace may be secured over a wide range of temperatures. It can readily be seen that the construction of the thermostat is simple and that the mechanism may easily be adjusted for different ranges of temperature.

While the invention has been described in connection with a gas-fired heating system, other applications will readily be apparent to those skilled in the art. It is not, therefore, desired that the invention be limited to the particular construction illustrated and described and it is intended by the appended claims to cover all modifications within the spirit and scope of the invention.

What I claim as new and desire to secure by Letters Patent of the United States is:

1. A thermostat comprising a supporting member, a pair of C-shaped magnets mounted on said member in oppositely facing positions with an air gap therebetween and lying in spaced substantially parallel planes, a temperature responsive element mounted on said member for movement transversely of said planes, a magnetic armature carried by said element and movable in said air gap whereby said armature is movable from a first position substantially bridging the poles of one of said magnets to a second position substantially bridging the poles of the outer of said magnets, and a pair of windings mounted on said magnets whereby the reactances of said windings are varied oppositely upon movement of said armature.

2. A thermostat comprising a supporting member, a pair of oppositely facing C-shaped magnets mounted on said member in spaced substantially parallel planes and with their poles extending toward each other and spaced apart to provide an air gap between said magnets, an elongated magnetic armature for selectively bridging the pairs of poles of said magnets, means including a temperature responsive element for carrying said armature in said air gap and for moving said armature in said gap transversely of said planes with the longitudinal axis of said armature substantially parallel thereto, said armature being movable from a first position substantially bridging the poles of one of said magnets to a second position substantially bridging the poles of the other of said magnets, and electric windings on said magnets whereby the respective reactances of said windings are varied oppositely on movement of said armature in accordance with changes in temperature.

3. A thermostat comprising a supporting plate having an elongated opening therein, a temperature responsive bimetallic element secured to said plate near one end of said opening and movable laterally of said plate in alignment with said opening on changes in temperature, a pair of C-shaped magnets arranged on opposite sides of said plate and on opposite sides of said opening adjacent said other end thereof having their poles arranged in opposition and spaced apart across said opening, a magnetic armature carried by said bimetal element and arranged in one position of said element to substantially bridge the poles of one of said magnets and in a second position of said element to substantially bridge the poles of the other of said magnets, and electric windings on said magnets whereby the respective reactances of said windings are varied oppositely on movement of said armature in accordance with changes in temperature.

4. A thermostat comprising a supporting plate having an elongated opening therein, a temperature responsive bimetallic element secured to said plate near one end of said opening and movable laterally of said plate in alignment with said opening on changes in temperature, a pair of C-shaped magnets arranged on opposite sides of said plate and on opposite sides of said opening adjacent the other end thereof having their poles arranged in opposition and spaced apart across said opening, a magnetic armature carried by said bimetal element and arranged in one position of said element to substantially bridge the poles of one of said magnets and in a second position of said element to substantially bridge the poles of the other of said magnets, said plate having cut-away portions about the respective poles of said magnets nearer said other end of said plate, and electric windings mounted on said last-mentioned poles whereby the respective reactances of said windings are varied oppositely on movement of said armature in accordance with changes in temperature.

5. A thermostat comprising a supporting plate having an elongated opening therein, a temperature responsive bimetallic element secured to said plate near one end of said opening and movable laterally of said plate in alignment with said opening on changes in temperature, a pair of C-shaped magnets arranged on opposite sides of said plate and on opposite sides of said opening adjacent the other end thereof having their poles arranged in opposition and spaced apart across said opening, a magnetic armature carried by said bimetal element and arranged in one position of said element to substantially bridge the poles of one of said magnets and in a second position of said element to substantially bridge the poles of the other of said magnets, electric windings on said magnets whereby the respective reactances of said windings are varied oppositely on movement of said armature in accordance with changes in temperature, and an adjusting member mounted on said plate and engaging said strip for selectively positioning said bimetallic element for operation within predetermined temperature ranges.

6. A thermostat comprising a supporting plate having an elongated opening therein, a temperature responsive bimetallic element secured to said plate near one end of said opening and movable laterally of said plate in alignment with said opening on changes in temperature, a pair of C-shaped magnets arranged on opposite sides of said plate and on opposite sides of said opening adjacent the other end thereof having their poles arranged in opposition and spaced apart across said opening, a magnetic armature carried by said bimetal element and arranged in one position of said element to substantially bridge the poles of one of said magnets and in a second position of said element to substantially bridge the poles of the other of said magnets, said plate and the adjacent end of said bimetal element having cut-away portions about the respective poles of said magnets nearer said other end of said plate, and electric windings mounted on said last-mentioned poles whereby the respective reactances of said windings are varied oppositely on movement of said armature in accordance with changes in temperature and whereby said coils when said plate is mounted in an upright position lie above the effective temperature sensitive portion of said element and the effects of variations of temperature of said coils are minimized.

PHILLIP H. ESTES.

REFERENCES CITED

The following references are of record in the file of this patent:

UNITED STATES PATENTS

| Number | Name | Date |
| --- | --- | --- |
| 548,230 | Shallenberger | Oct. 22, 1895 |
| 2,371,236 | Gille et al. | Mar. 13, 1945 |
| 2,509,210 | Clark | May 30, 1950 |
| 2,523,509 | Lilja | Sept. 26, 1950 |
| 2,559,919 | Gustafsson | July 10, 1951 |